R. W. McClelland.
Horse Rake.
Nº 91858      Patented Jun. 29, 1869
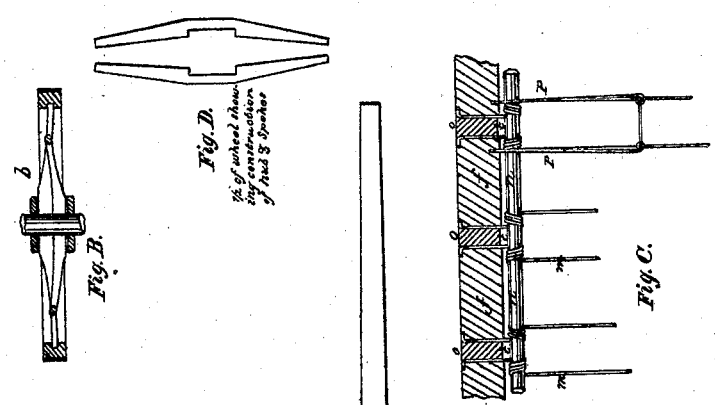
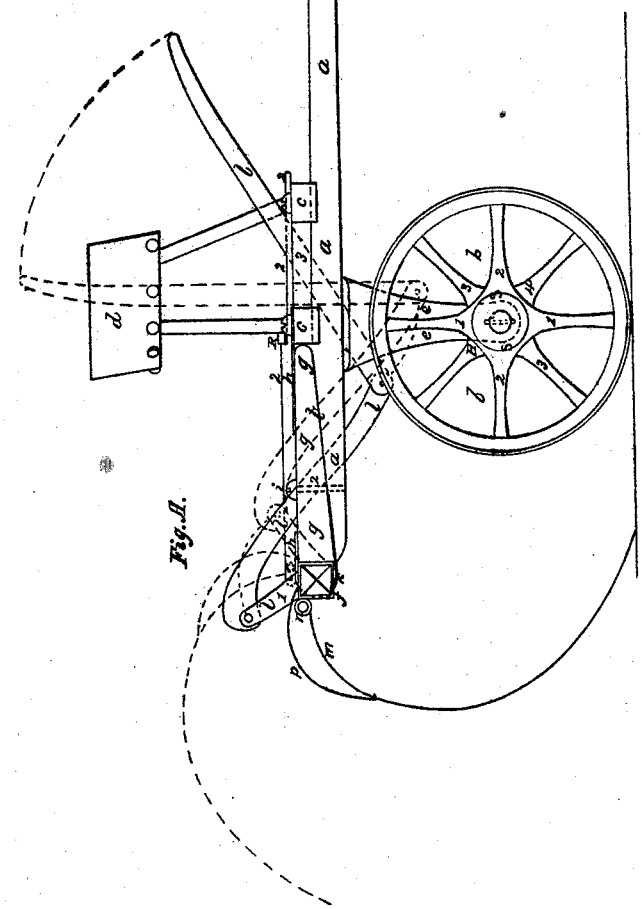
Witnesses,
George P. Marcy
C. B. Burce
Inventor,
R. W. McClelland
By Cullen & Marcy
Attorneys

United States Patent Office.

ROBERT W. McCLELLAND, OF SPRINGFIELD, ILLINOIS.

Letters Patent No. 91,858, dated June 29, 1869.

IMPROVEMENT IN HORSE-RAKES.

The Schedule referred to in these Letters Patent and making part of the same.

*To all whom it may concern:*

Be it known that I, ROBERT W. McCLELLAND, of Springfield, in the county of Sangamon, and in the State of Illinois, have invented an Improved Horse Hay-Rake; and do hereby declare that the following is a full, clear, and exact description thereof, reference being had to the accompanying drawings, and to the letters of reference marked thereon.

The nature of my invention consists in an improved construction of the different parts of a horse hay-rake, and in the combination and arrangement of the same.

Figure A represents a side view of the rake, the black lines indicating the position of the lever, rake-head, and teeth, when the rake is at work, and the red lines indicating the position of the same when the operator is dumping the hay.

The frame of the rake consists of a pair of shafts, $a\ a$, elevated above the wheels $b\ b$, with the two cross-bars $c\ c$, one directly over the centre of the wheels $b$, and the other a short distance forward of the wheel.

Upon these cross-bars the seat $d$ is placed.

Extending downward from the outside or inside, as may be desired, of the shafts $a\ a$, and directly under the rear cross-bar $c$, are the two crank-arms $e\ e$, to which the wheels $b\ b$ are attached.

By this arrangement we dispense with an axle-tree, and whenever we desire to raise the wheels $b\ b$ higher than the shafts $a\ a$, these crank-arms $e\ e$ can be attached to the outside of the shafts $a\ a$.

By this arrangement also the wheels $b\ b$ are placed before the rake-head, and their track is thus made much narrower than in other rakes which have their wheels outside of their rake-head.

The track of the wheels being thus made narrower, and always inside of the rake-head, the wheels themselves never run over the windrow, and the rake is not thrown out of its level position when being discharged of its load of hay.

Again, by this arrangement of the wheels $b\ b$, the track being narrower, the draught is shortened and made easier.

The weight of everything, also, comes directly over the wheels, and thus the rake-head is relieved from all strain.

The shafts $a\ a$ extend backward from the wheels sufficiently far to give the rake-head and teeth full play in the rear of the wheels $b\ b$, without interfering with the same.

The rake-head $f$ is attached to the rear end of shafts $a\ a$, by means of the wooden pieces $g\ g$, fitted to, corresponding with, and lapping upon the top of the shafts $a\ a$, as far up as the rear cross-bars $e\ e$, which wooden pieces $g\ g$ are fastened to the shafts $a\ a$ by the spring-hinges $h\ h$ and the adjusting-screws $i\ i$.

These screws $i\ i$ perform the office of adjusting the rake-head to uneven ground, and by simply screwing or unscrewing which, the play of the rake-head is decreased or increased.

The hinges $h\ h$ are composed of flat pieces of elastic steel, one end fastened by a screw to the top of the wooden piece $g$, the other to the top of the cross-bar $c$, the elasticity of the steel affording sufficient spring.

The rake-head $f$ is connected with the ends of these wooden pieces $g\ g$, by the metal bands $k\ k$, in which the rake-head $f$ makes a semi-revolution when operated upon by the lever $l$.

Figure C shows the method of attaching the teeth $m\ m$ to the rake-head.

These teeth $m\ m$ consist of a single piece of wire, semicircular in shape from the ground to the rake-head.

The end nearest the rake-head is coiled any desired number of times over a wooden or metal rod, $n$, which is close up to and parallel with the rake-head $f$, and then, after being so coiled, it is thrust into and through the mortise $t$, made in the rake-head, and after penetrating the same, is bent outward, so as to clasp the wood on the side of the mortise.

The ends of two teeth, after being coiled around the rod $n$, as described, are inserted in the same mortise, and then bent outward, and a wedge, $o$, driven into the mortise between them, to make them more secure.

A double wire brace, $p$, is attached to every ten teeth. This consists of one piece of wire fastened securely by one end in the top of the rake-head $f$, and passing over and parallel with the back of one tooth, $m$, until it reaches nearly the centre; it is then bent and looped around that tooth, and passed across to the next one, whose end is inserted in the same mortise in the rake-head, and looped around that in the same way, and then is bent again and passed upward over the second tooth, and the end of it inserted in the rake-head as the other end was.

This double brace $p$ prevents the teeth from being too elastic when loaded heavily.

Q is a foot-lock, which keeps the rake-head in place, and consists of a strip of wood fastened at the but to the rake-head $f$, and extending forward under the driver's seat, is fastened by the catch $r$. The foot of the driver slides this out of the catch when he wishes to raise the teeth to dump the hay by means of the lever $l$.

$l$ is a jointed lever, which, in the hands of the driver, causes the semi-revolution of the rake-head. It consists of the short piece 1, extending upward from the rake-head, where the long strip 2 is hinged to it, which extends downward underneath the cross-bar $c$, where it is jointed again with the upright strip 3.

The red lines in Fig. A indicate its line of motion, and its position when the teeth are raised.

The spokes and hubs of the wheels $b\ b$ consist of the same pieces of wood, of which only four compose the whole.

Figure D represents the shape of these four pieces of wood that compose this kind of wheel.

The four pieces in the wheel $b$, marked 1, 2, 3, and 4, form ten crosses, each cross composed of two pieces of wood, made broad and strong in the centre, and notched so as to fit into each other, and present a smooth surface, and both crosses are fastened firmly together in the centre, so as to form a solid hub with eight spokes.

This hub is still further strengthened by putting an iron flange, S S, on each side, and binding them to the hub by bolts and screws.

Now, what I claim as my invention, and desire to secure by Letters Patent, is—

1. The combination and arrangement of the rake-head $f$ and wooden pieces $g\ g$ with the spring-bars $h\ h$, and adjusting-screw $i\ i$, in the manner and for the purposes described.

2. The combination of the rake-head $f$ with the foot-lock Q, substantially as and for the purposes set forth.

3. The construction and arrangement of the four pieces 1, 2, 3, 4, either of wood or metal, forming the hub and spokes of the wheel $b$, substantially as herein described and for the purposes set forth.

4. These four pieces 1, 2, 3, 4, constructed and joined together, as described, with the flanges S S, as and for the purposes set forth.

In testimony that I claim the foregoing, I have hereunto set my hand, this 6th day of April, 1869.

ROBERT W. McCLELLAND.

Witnesses:
GEORGE P. MARCY,
E. B. BIERCE.